United States Patent [19]

MacArthur

[11] Patent Number: 5,679,958
[45] Date of Patent: Oct. 21, 1997

[54] BETA PARTICLE MONITOR FOR SURFACES

[75] Inventor: Duncan W. MacArthur, Los Alamos, N. Mex.

[73] Assignee: The Regents of the University of California, Oakland, Calif.

[21] Appl. No.: 607,672

[22] Filed: Feb. 27, 1996

[51] Int. Cl.⁶ .................... G01T 1/185; H01J 47/02
[52] U.S. Cl. .................... 250/382; 250/374; 250/379; 250/384
[58] Field of Search ........................ 250/384, 382, 250/381, 379, 374

[56] References Cited

U.S. PATENT DOCUMENTS

| | | | |
|---|---|---|---|
| 5,184,019 | 2/1993 | MacArthur et al. | 250/380 |
| 5,187,370 | 2/1993 | MacArthur et al. | 250/379 |
| 5,194,737 | 3/1993 | MacArthur et al. | 250/382 |
| 5,281,824 | 1/1994 | MacArthur et al. | 250/380 |
| 5,298,754 | 3/1994 | Anderson et al. | 250/379 |
| 5,311,025 | 5/1994 | MacArthur et al. | 250/374 |
| 5,539,208 | 7/1996 | Overhoff | 250/379 |

FOREIGN PATENT DOCUMENTS 6-96720  4/1994  Japan ........................ 250/374

*Primary Examiner*—Constantine Hannaher
*Attorney, Agent, or Firm*—Milton D. Wyrick; William A. Eklund

[57] ABSTRACT

A beta radiation detector which is capable of reliably detecting beta radiation emitted from a surface. An electrically conductive signal collector is adjustably mounted inside an electrically conductive enclosure which may define a single large opening for placing against a surface. The adjustable mounting of the electrically conductive signal collector can be based on the distance from the surface or on the expected beta energy range. A voltage source is connected to the signal collector through an electrometer or other display means for creating an electric field between the signal collector and the enclosure. Air ions created by the beta radiation are collected and the current produced is indicated on the electrometer or other display means.

13 Claims, 2 Drawing Sheets

BETA PARTICLE MONITOR FOR SURFACES

The present invention generally relates to the detection of radiation, and, more specifically, to the detection of beta particle radiation. This invention was made with Government support under Contract No. W-7405-ENG-36 awarded by the U.S. Department of Energy. The Government has certain rights in the invention. For the safety of individuals, the detection of beta particle radiation is of extreme importance in any location where radioactive materials are handled. In the past, the detection of beta radiation from surfaces has been accomplished primarily through two types of monitors. The first involves the use of swipes or smears taken from surfaces to detect loose surface contamination. These samples are analyzed remotely. This technique offers good sensitivity for loose contamination, but is slow, relatively expensive, and dependent on the skill of the individual acquiring the samples. This type of radiation sampling is also subject to missing portions of the contamination. The second technique involves chemical analysis of samples to determine the tritium content of materials. This technique is physically destructive of the sample, and is very slow and expensive.

FIELD OF THE INVENTION

In conclusion, neither of these techniques is capable of providing the sensitive, real time characterization of surfaces that is required for worker protection and facility decontamination. Even if both of these techniques were applied in such an application, suitable results would not be obtained.

The present invention provides a detector for beta radiation. It is based on technology which is contained in several U.S. Patents which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Pat. No. 5,281,824, issued Jan. 25, 1994, for Radioactive Detection. The fifth is U.S. Pat. No. 5,311,025, issued May 10, 1994, for Fan-less Long Range Alpha Detector. Another recently filed application bears Ser. No. 08/333,020, filed Nov. 1, 1994, entitled "Event Counting Alpha Detector," now U.S. Pat. No. 5,550,881. Still other recently filed applications bear Ser. No. 08/382,333, filed Feb. 1, 1995, entitled "Background Canceling Surface Alpha Detector," now U.S. Pat. No. 5,525,804, Ser. No. 08/395,934, filed Feb. 27, 1995, entitled "High Air Flow Alpha Detector," (having received a Notice of Allowability dated Nov. 29, 1995), now U.S. Pat. No. 5,514,872, Ser. No. 08/456,272, filed May 31, 1995 entitled "Segmented Surface Alpha Detector," now abandoned, and Ser. No. 08/531,998, filed Sep. 21, 1995, entitled "Gamma Ray Detector," now abandoned.

As previously described, the principle underlying each of these patents and patent applications is that alpha particles, although themselves of very short range in air, ionize various of the molecular species in air. The present invention modifies this apparatus to provide for reliable detection of beta radiation from surfaces and other locations from which beta radiation might be emitted. This is accomplished through the detection of air ions created by the beta radiation.

The long range alpha detectors, as described in the above-referenced patents and applications, have demonstrated that alpha radiation can be detected at a considerable distance from its point of emanation through the detection of air ions created by the alpha radiation. This mechanism also allows the present invention to monitor for beta contamination in areas which are extremely difficult or even impossible for current detectors to effectively operate. The current invention accomplishes this through the use of a chamber large enough to allow beta radiation to create air ions which are detected by the present invention and, in one embodiment, a signal collector that can be adjusted to a distance from the surface to be measured which is appropriate for the energy level of the beta radiation expected.

It is therefore an object of the present invention to provide apparatus for the detection of beta radiation.

It is another object of the present invention to provide apparatus which can detect radiation from surfaces, and from individuals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided a beta radiation detector comprising an electrically conductive enclosure defining a cavity sufficiently large to allow for interaction to occur between beta radiation and air molecules, the enclosure having an opening at one end for positioning against a surface. An electrically conductive signal collector is insulatively mounted in the cavity of the electrically conductive enclosure and adjustably spaced inwardly from the opening, the electrically conductive signal collector being sized and positioned to substantially span the cavity so that said air ions generated in the cavity through interaction with beta radiation are electrostatically captured by the electrically conductive signal collector and the electrically conductive enclosure when an electric potential is applied between the electrically conductive enclosure and the electrically conductive signal collector, and the electrically conductive signal collector being configured to allow free circulation of air through the cavity and past the electrically conductive signal collector. Indicator means is attached to the electrically conductive signal collector for indicating an electrical current produced by collection of air ions generated in the cavity by beta radiation emanating from the surface. A voltage source is connected between the indicator means and the electrically conductive enclosure for creating the electric potential between the electrically conductive enclosure and the electrically conductive signal collector.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for the real time detection of beta radiation from surfaces. The invention accomplishes this through the detection of air or gas ions created through interaction with the beta radiation emanating from the surface. The invention can be best understood through reference to the drawings.

Figure 1:
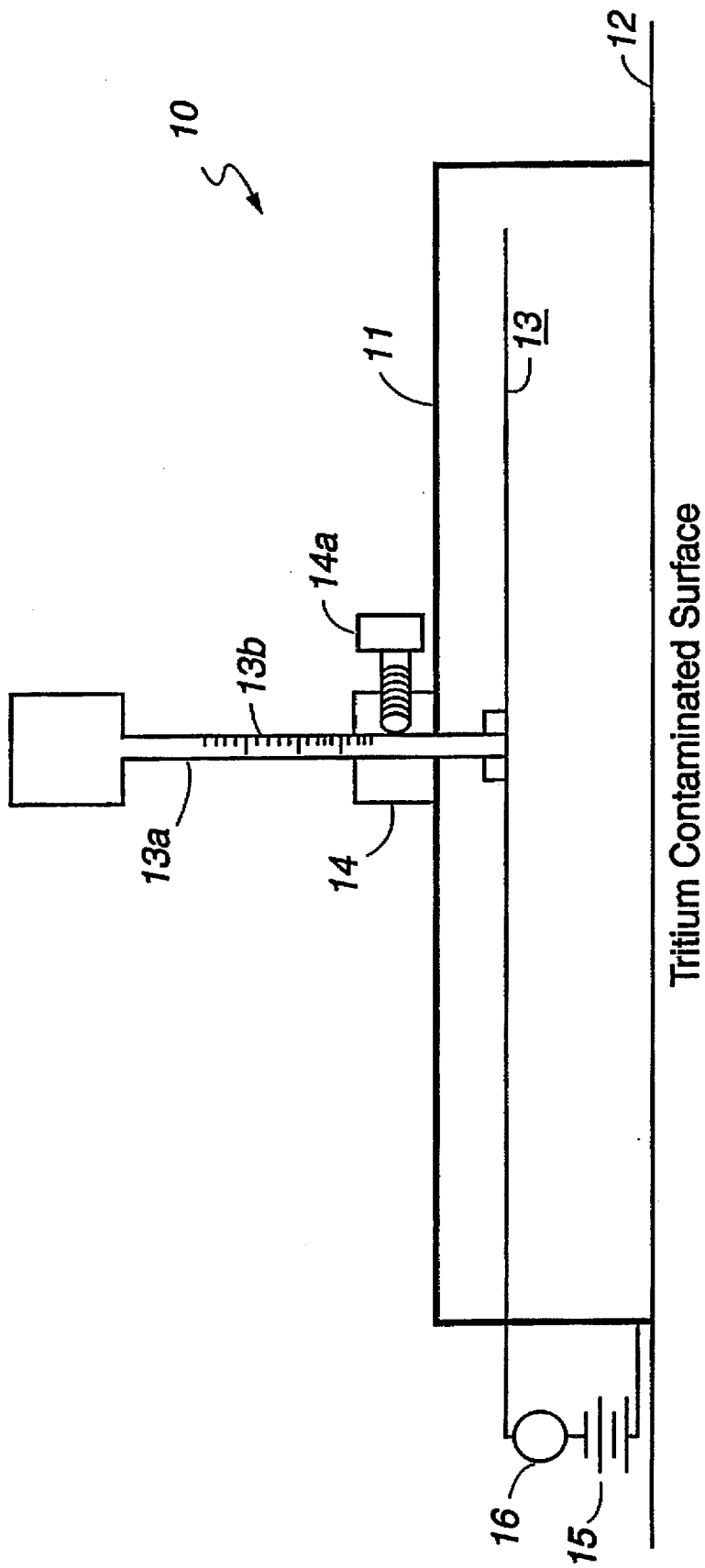
FIG. 1 is a cross-sectional illustration of one embodiment of present invention in which an electrically conductive enclosure contains an adjustable electrically conductive signal collector and is placed over a surface to be monitored for beta radiation.

In FIG. 1, a cross-sectional view of one embodiment of the present invention is illustrated. This embodiment is intended to detect beta radiation, such as emanates from tritium on a surface, in an electrostatic manner. Here, detector 10 is shown comprising electrically conductive enclosure 11, which defines a cavity with an opening, the opening being placed over surface 12. Inside electrically conductive enclosure 11, electrically conductive signal collector 13 is insulatively mounted in a manner to allow for adjustment with respect to electrically conductive enclosure 11 and surface 12, for the collection of ions created through interaction of air or other gas molecules with beta radiation.

In the embodiments of the present invention, electrically conductive signal collector 13 can take the form of an electrode, an electrically conductive grid, a wire mesh, or a plate, with or without perforations, depending on the nature of the application. It is important with whatever electrically conductive signal collector 13 is employed, that it span substantially the appropriate dimensions of electrically conductive enclosure 11. Electrically conductive signal collector 13 may be made of any appropriate electrically conductive material, such as aluminum or copper, for example. It has been found that copper clad printed circuit board provides an excellent electrically conductive signal collector 13, with the copper cladding providing the electrical conduction and the inner board section providing structural strength.

It is a feature of the present invention that electrically conductive signal collector 13 is adjustable within electrically conductive enclosure 11. This adjustment allows electrically conductive signal collector 13 to be positioned properly with respect to surface 12 for an anticipated beta energy. The adjustment can be accomplished with a simple collar 14 and setscrew 14a through which shaft 13a. extends, as shown in FIG. 1, or with any other appropriate means. Shaft 13a could be inscribed with markings 13b to indicate the depth to which electrically conductive signal collector extends into electrically conductive enclosure, or markings to indicate various beta radiation energy levels.

Important to this embodiment is the requirement that electrically conductive enclosure 11 be sized sufficiently large to allow the beta radiation space in which to interact with the air or other gas molecules to create air or gas ions for detection. This sufficiency in size of electrically conductive enclosure 11 is realized also with the adjustability of electrically conductive signal collector 13.

As shown in FIG. 1, voltage source 15 is connected to electrically conductive signal collector 13 through electrometer 16, and is grounded to electrically conductive enclosure 11. Voltage source 15 provides the necessary electrical potential to provide an electric field between electrically conductive signal collector 13 and electrically conductive enclosure 11 to attract gas ions created by beta radiation to electrically conductive signal collector 13 and electrically conductive enclosure 11. The current produced by these gas ions will be indicated by electrometer 16, or other appropriate display apparatus.

Voltage source 15 need supply only approximately 300 V or less for proper operation of detector 10. This voltage can be supplied by any appropriate direct current source. When detector 10 is to be employed in field operations, it will be most convenient if voltage source 15 is a battery. However, it should be recognized that an alternating current source also could be used. In this event, gas ions of both polarities will be detected by electrically conductive signal collector 13.

Figure 2:
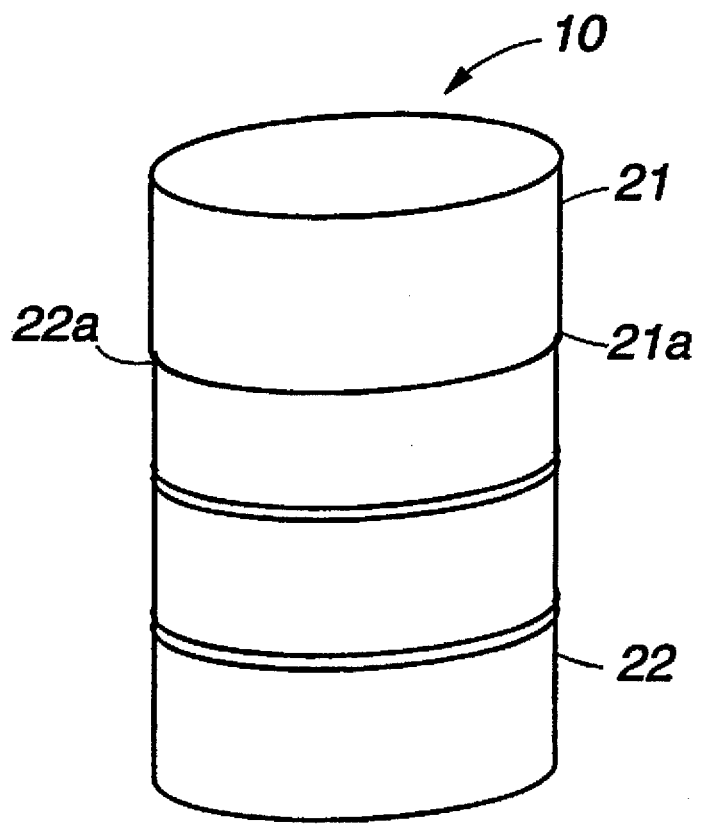
FIG. 2 is perspective view of another embodiment of the present invention in which the electrically conductive enclosure is cylindrical and sized to mate with the top surface of a barrel.

Another embodiment of the present invention is illustrated in FIG. 2, for use in monitoring barrels or other small simple surfaces which might contain radioactive waste products. As seen in FIG. 2, detector 10 has electrically conductive enclosure 21 cylindrically shaped, but open at end 21a to fit snugly over top surface 22a of barrel 22. As before, the volume of electrically conductive enclosure 21 must be sufficiently large to allow beta radiation to interact with air ions in electrically conductive enclosure 21.

In the embodiment of FIG. 2, it will be necessary to form electrically conductive signal collector 13 (FIG. 1) as a circular shaped disk having a slightly smaller diameter than the diameter of electrically conductive enclosure 21. This is to insure that electrically conductive signal collector 13 substantially spans electrically conductive enclosure 21.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A beta radiation detector comprising:
    an electrically conductive enclosure defining a cavity sufficiently large to allow for interaction to occur between beta radiation and air molecules, said enclosure having an opening at one end for positioning against a surface;
    an electrically conductive signal collector insulatively mounted in said cavity of said electrically conductive enclosure, adjustably spaced inwardly from said opening and defining an indicator for indicating the adjustment position of said electrically conductive signal collector, said electrically conductive signal collector being sized and positioned to substantially span said cavity so that said air ions generated in said cavity through interaction with beta radiation are electrostatically captured by said electrically conductive signal collector and said electrically conductive enclosure when an electric potential is applied between said electrically conductive enclosure and said electrically conductive signal collector, and said electrically conductive signal collector being configured to allow free circulation of air through said cavity and past said electrically conductive signal collector;
    indicator means attached to said electrically conductive signal collector for indicating an electrical current produced by collection of air ions generated in said cavity by beta radiation emanating from said surface; and a voltage source connected between said indicator means and said electrically conductive enclosure for creating said electric potential between said electrically conductive enclosure and said electrically conductive signal collector.

2. The beta radiation detector as described in claim 1, wherein said electrically conductive signal collector is fixed in position in said electrically conductive enclosure.

3. The beta radiation detector as described in claim 2 wherein said beta radiation detector is used to monitor for tritium.

4. The beta radiation detector as described in claim 1, wherein said electrically conductive signal collector comprises aluminum.

5. The beta radiation detector as described in claim 1, wherein said electrically conductive signal collector comprises copper.

6. The beta radiation detector as described in claim 11, wherein said signal collector comprises a perforated sheet of an electrically conductive material.

7. The beta radiation detector as described in claim 1, wherein said signal collector comprises a planar electrically conductive grid.

8. The beta radiation detector as described in claim 1, wherein said signal collector means comprises an electrode.

9. The beta radiation detector as described in claim 1, wherein said signal collector means comprises a copper clad printed circuit board.

10. The beta radiation detector as described in claim 1, wherein said voltage source provides a voltage of approximately 300 V.

11. The beta radiation detector as described in claim 10, wherein said voltage source comprises a battery.

12. The beta radiation detector as described in claim 10, wherein said voltage source comprises a source of alternating current.

13. The beta radiation detector as described in claim 10, wherein said electrically conductive enclosure is cylindrically shaped and defines a diameter sized to fit over a top surface of a barrel.

* * * * *